US012803741B2

(12) United States Patent
Shao et al.

(10) Patent No.: US 12,803,741 B2
(45) Date of Patent: Nov. 17, 2026

(54) SYSTEMS AND METHODS FOR UE REPORTING TO FACILITATE HANDOVER

(71) Applicant: ZTE CORPORATION, Shenzhen (CN)

(72) Inventors: Shijia Shao, Shenzhen (CN); Bo Gao, Shenzhen (CN); Ke Yao, Shenzhen (CN); Shujuan Zhang, Shenzhen (CN); Zhen He, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 418 days.

(21) Appl. No.: 17/951,770

(22) Filed: Sep. 23, 2022

(65) Prior Publication Data

US 2023/0069919 A1 Mar. 9, 2023

Related U.S. Application Data

(63) Continuation of application No. PCT/CN2021/071731, filed on Jan. 14, 2021.

(51) Int. Cl.

*H04W 24/10* (2009.01)
*H04L 1/20* (2006.01)
*H04L 5/00* (2006.01)

(52) U.S. Cl.

CPC ............ *H04L 5/0051* (2013.01); *H04L 1/203* (2013.01); *H04W 24/10* (2013.01)

(58) Field of Classification Search

CPC ....... H04L 5/0051; H04L 1/203; H04L 5/005; H04L 5/0057; H04L 5/0048; H04W 24/10; H04W 36/0058; H04W 36/0085; H04W 36/30; H04W 72/1268; H04W 72/21; H04W 72/231; H04W 72/232

See application file for complete search history.

(56) References Cited

U.S. PATENT DOCUMENTS

2015/0063287 A1* 3/2015 Mazzarese ............ H04W 24/10 370/329
2019/0246321 A1* 8/2019 Li ......................... H04W 36/30
2020/0119797 A1* 4/2020 Wang ................... H04B 7/0632

(Continued)

FOREIGN PATENT DOCUMENTS

CN 105210405 A * 12/2015 ........... H04B 7/0456
CN 105612777 A 5/2016

(Continued)

OTHER PUBLICATIONS

Apple Inc., 3GPP TSG-RAN WG1 Meeting #102-e, R1-2006502, Aug. 28, 2020, e-Meeting (4 pages).

(Continued)

*Primary Examiner* — Mohammad S Adhami
*Assistant Examiner* — Samuel Dilan Rutnam
(74) *Attorney, Agent, or Firm* — Foley & Lardner LLP

(57) ABSTRACT

Systems, methods and devices for TRP handover may include a wireless communication device receiving at least a first reference signal (RS), and a second RS. The wireless communication device may determine a first channel quality associated with the first RS, and a second channel quality associated with the second RS. The wireless communication device may transmit, to a wireless communication node, a report including information associated with at least one of the first RS or the second RS.

20 Claims, 9 Drawing Sheets

(56) References Cited

U.S. PATENT DOCUMENTS

| | | | | |
|---|---|---|---|---|
| 2020/0228297 | A1* | 7/2020 | Zhang | H04L 1/06 |
| 2021/0288696 | A1* | 9/2021 | Jung | H04B 7/024 |

FOREIGN PATENT DOCUMENTS

| | | | | | |
|---|---|---|---|---|---|
| CN | 111034322 | A | | 4/2020 | |
| CN | 111432479 | A | * | 7/2020 | H04B 17/309 |
| CN | 111656703 | A | | 9/2020 | |
| KR | 20180018436 | A | | 2/2018 | |
| WO | WO-2012/024348 | A1 | | 2/2012 | |
| WO | WO-2021037011 | A1 | * | 3/2021 | H04W 36/0072 |

OTHER PUBLICATIONS

AT&T, "Enhancements on Beam Management for Multi-TRP" 3GPP TSG RAN WG1 #103e, R1-2008308, Nov. 13, 2020, e-Meeting (6 pages).

CATT, "Discussion on enhancement on multi-beam operation" 3GPP TSG RAN WG1 #103-e, R1-2007824, Nov. 13, 2020, e-Meeting (10 pages).

Intel Corporation, "Enhancements on Multi-Beam Operation" 3GPP TSG RAN WG1 #103-e, R1-2008977, Nov. 13, 2020, e-Meeting (16 pages).

Moderator (CATT), "Summary on email discussion on beam management for simultaneous multi-TRP transmission with multiple Rx panels" 3GPP TSG RAN WG1 Meeting #102-e, R1-2007294, Aug. 28, 2020, e-Meeting (21 pages).

Moderator (Samsung), "Moderator summary for multi-beam enhancement" 3GPP TSG RAN WG1 #102-e, R1-2006127, Aug. 28, 2020, e-Meeting (33 pages).

Moderator (Samsung), "Moderator summary for multi-beam enhancement: EVM" 3GPP TSG RAN WG1 #102-e, R1-2007151, Aug. 28, 2020, e-Meeting (33 pages).

NTT Docomo Inc., "Discussion on multi-beam operation" 3GPP TSG RAN WG1 #103-e, R1-2009174, Nov. 13, 2020, e-Meeting (22 pages).

Qualcomm Incorporated, "Enhancements on Multi-beam Operation" 3GPP TSG RAN WG1 Meeting #102-e, R1-2006790, Aug. 28, 2020, e-Meeting (7 pages).

Samsung, "Multi-beam enhancements" 3GPP TSG RAN WG1 #103-e, R1-2008148, Nov. 13, 2020, e-Meeting (20 pages).

Spreadtrum Communications, "Enhancements on Multi-beam Operation" 3GPP TSG RAN WG1 #103-e, R1-2009141, Nov. 13, 2020, e-Meeting (8 pages).

Vivo, "Discussion on MTRP multi-beam enhancement" 3GPP TSG RAN WG1 #102-e, R1-2005366, Aug. 28, 2020, e-Meeting (5 pages).

Vivo, "Discussion on multi-beam enhancement" 3GPP TSG RAN WG1 #102-e , R1-2005363, Aug. 28, 2020, e-Meeting (21 pages).

Vivo, "Further discussion on multi beam enhancement" 3GPP TSG RAN WG1 #103-e, R1-2007644, Nov. 13, 2020, e-Meeting (26 pages).

Xiaomi, "Potential positioning enhancements" 3GPP TSG RAN WG1 #102-e, R1-2006547, Aug. 28, 2020, e-Meeting (5 pages).

Extended European Search Report for EP Appl. No. 21918353.0, dated Jun. 17, 2024 (11 pages).

International Search Report and Written Opinion for PCT Appl. No. PCT/CN2021/071731, mailed Oct. 14, 2021 (8 pages).

ZTE: "Further details on Multi-beam and Multi-TRP operation" 3GPP Tsg Ran WG1 Meeting #103-e; R1-2007770; Nov. 13, 2020; e-Meeting (14 pages).

Office Action for KR Appl. No. 10-2023-7027241, dated Nov. 3, 2025 (with English translation, 11 pages).

First Examination Report on IN Appl. No. 202327053945 dated Jul. 16, 2026 (6 pages).

First Office Action on CN Appl. No. 202180049292.6 dated Jul. 1, 2026 (17 pages with English translation).

Second Office Action on KR Appl. No. 10-2023-7027241 dated Jul. 13, 2026 (16 pages with English translation).

* cited by examiner

SYSTEMS AND METHODS FOR UE REPORTING TO FACILITATE HANDOVER

CROSS-REFERENCE TO RELATED APPLICATION

This application claims the benefit of priority under 35 U.S.C. § 120 as a continuation of PCT Patent Application No. PCT/CN2021/071731, filed on Jan. 14, 2021, the disclosure of which is incorporated herein by reference in its entirety.

TECHNICAL FIELD

The disclosure relates generally to wireless communications, including but not limited to systems and methods for UE reporting to facilitate handover.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive at least a first reference signal (RS), and a second RS. The wireless communication device may determine a first channel quality associated with the first RS, and a second channel quality associated with the second RS. The wireless communication device may transmit, to a wireless communication node, a report including information associated with at least one of the first RS or the second RS.

In some embodiments, the report may include the information associated with the first RS and the second RS in response to a triggering event determined according to the first channel quality and the second channel quality. the triggering event can include at least one of (i) the first channel quality associated with the first RS, is better than or equal to a threshold, and the second channel quality associated with the second RS, is better than or equal to the threshold, (ii) the first channel quality associated with the first RS, is better than or equal to the threshold, and the second channel quality associated with the second RS, is better than or equal to the first channel quality, or (iii) the first channel quality associated with the first RS, is better than or equal to the threshold, and the second channel quality associated with the second RS, is within a channel quality range having a first bound equal to a difference between the first channel quality and an offset amount, and a second bound equal to a sum of the offset amount and the first channel quality. A channel quality better than or equal to a threshold may include at least one of a corresponding block error ratio (BLER) being lower than or equal to a first threshold, or a corresponding reference signal received power (RSRP), channel state information (CSI), signal-to-interference-plus-noise ratio (SINR) or channel quality information (CQI), being higher than or equal to a second threshold. The offset amount may be configurable. The report may include at least one of indexes of the first RS and the second RS respectively, indexes of panels of the wireless communication device corresponding to the first RS and the second RS respectively, or the first channel quality and the second channel quality, or the first channel quality and a joint channel quality determined using the first RS and the second RS. The first RS and the second RS can be received simultaneously by the wireless communication device, or the first RS and the second RS can be jointly used for determining a channel quality.

In some embodiments, the report may include the information associated with second RS in response to a triggering event determined according to the second channel quality. The triggering event may include at least one of (i) the first channel quality associated with the first RS, being worse than or equal to a threshold, and the second channel quality associated with the second RS, being better than or equal to the threshold, (ii) the first channel quality associated with the first RS, being worse than or equal to the threshold, and the second channel quality associated with the second RS, being better than the first channel quality, or (iii) the first channel quality associated with the first RS, being worse than or equal to the threshold, and the second channel quality associated with the second RS, being better than the first channel quality, by an offset amount. A channel quality worse than or equal to a threshold may include at least one of a corresponding block error ratio (BLER) being higher than or equal to a first threshold, or a corresponding reference signal received power (RSRP), channel state information (CSI), signal-to-interference-plus-noise ratio (SINR) or channel quality information (CQI), being lower than or equal to a second threshold. The offset amount may be configurable. The report may include at least one of an index of the second RS, an index of a panel of the wireless communication device corresponding to the second RS, the second channel quality, or a 1-bit value. The 1-bit value may indicate a switching mode. The switching mode may include at least one of Mode 1, which represents switching from receiving from a channel of the first RS to receiving from a channel of the second RS, or Mode 3, which represents switching from receiving from the channels of the first RS and the second RS to receiving from the channel of the second RS.

In some embodiments, the report may include the information associated with the second RS in response to a triggering event determined according to the second channel quality. The triggering event may include at least one of (i) the first channel quality associated with the first RS, being better than or equal to a threshold, and the second channel quality associated with the second RS, being better than or equal to the threshold, (ii) the first channel quality associated with the first RS, being better than or equal to the threshold, and the second channel quality associated with the second RS, being better than the first channel quality, or (iii) the first channel quality associated with the first RS, being better than or equal to the threshold, and the second channel quality associated with the second RS, being within a channel quality range having a first bound equal to a difference between the first channel quality and an offset amount, and a second bound equal to a sum of the offset amount and the first channel quality. A channel quality better than or equal to a threshold may include at least one of a corresponding block error ratio (BLER) being lower than or equal to a first threshold, or a corresponding reference signal received power (RSRP), channel state information (CSI), signal-to-interference-plus-noise ratio (SINR) or channel quality information (CQI), being higher than or equal to a second threshold. The offset amount may be configurable. The report may include at least one of an index of the second RS, an index of a panel of the wireless communication device corresponding to the second RS, the second channel quality, or a joint channel quality determined using the first RS and the second RS, or a 1-bit value. The 1-bit value may indicate a switching mode. The switching mode may include Mode 2, which represents switching from receiving from the channel of the first RS to receiving from the channels of the first RS and the second RS. When the 1-bit value is indicative of Mode 2, the first RS and the second RS can be received simultaneously by the wireless communication device, or the first RS and the second RS can be used for jointly determining a channel quality.

In some embodiments, the wireless communication device transmit, to the wireless communication node, the report via uplink control information (UCI), a physical uplink control channel (PUCCH) or a physical uplink shared channel (PUSCH).

In some embodiments, the wireless communication device may receive, from the wireless communication node, a response to the report. The response may include at least one of a downlink control information (DCI) signaling, a medium access control control element (MAC CE) signaling, or a physical downlink control channel (PDCCH) transmission, a dedicated radio network temporary identifier (RNTI) for a handover procedure, a reconfiguration or re-indication of transmission configuration indicator (TCI) state for a downlink (DL) transmission, or a configuration or reconfiguration of CORESETPoolIndex. In response to receiving the response to the report, the wireless communication device may perform at least one of receiving a downlink (DL) signal according to a quasi co-location (QCL) assumption corresponding to the first or the second RS, transmitting an uplink (UL) signal according to spatial relation information corresponding to the first or the second RS, or transmitting the UL signal using the first or the second RS as a pathloss reference signal (PL RS).

At least one aspect is directed to a system, method, apparatus, or a computer-readable medium. A wireless communication node may receive, from a wireless communication device, a report including information associated with at least one of a first reference signal (RS), or a second RS received by the wireless communication device. The wireless communication device may determine a first channel quality associated with the first RS, and a second channel quality associated with the second RS.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1 Mobile Communication Technology and Environment

Figure 1:
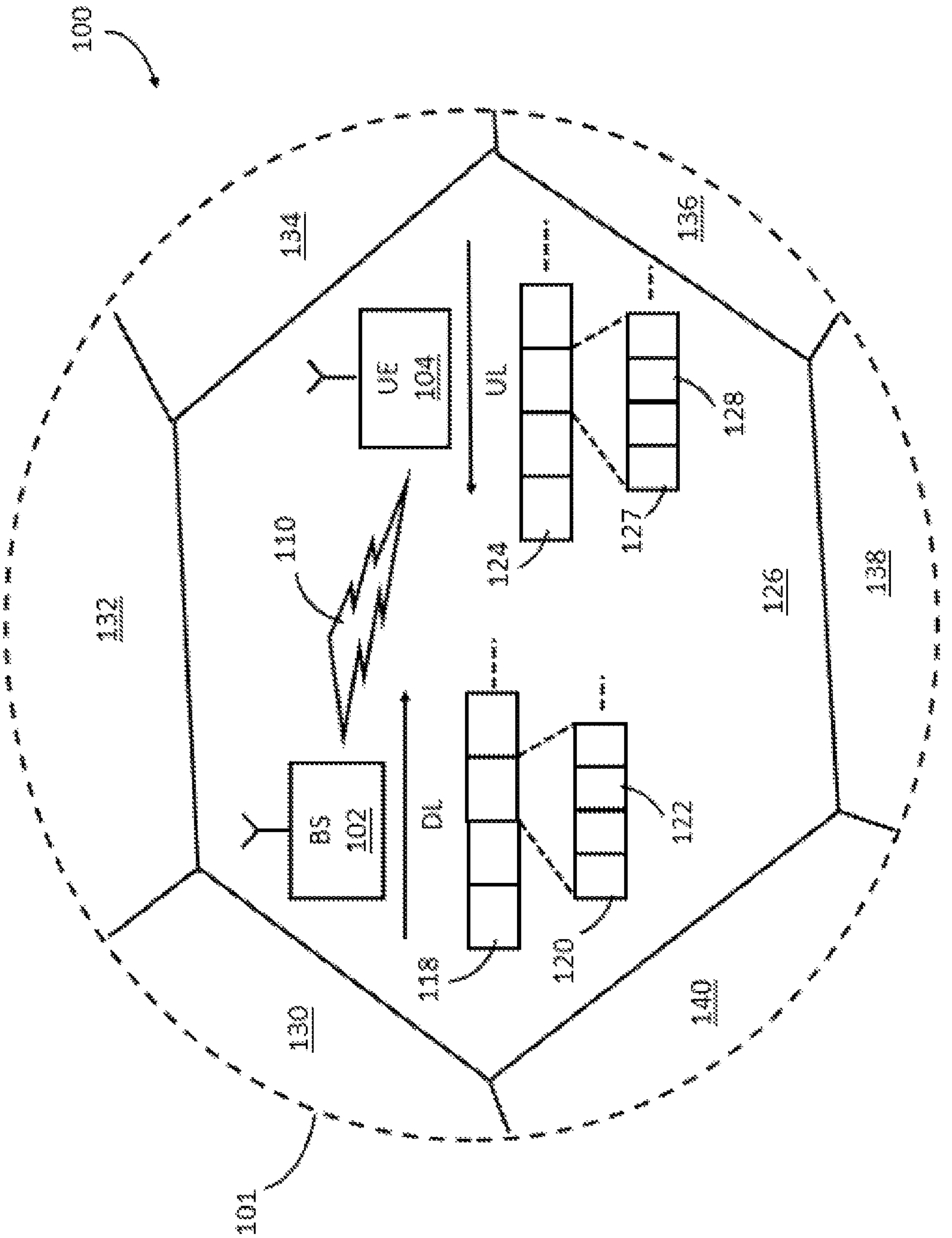
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodimentment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127, which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
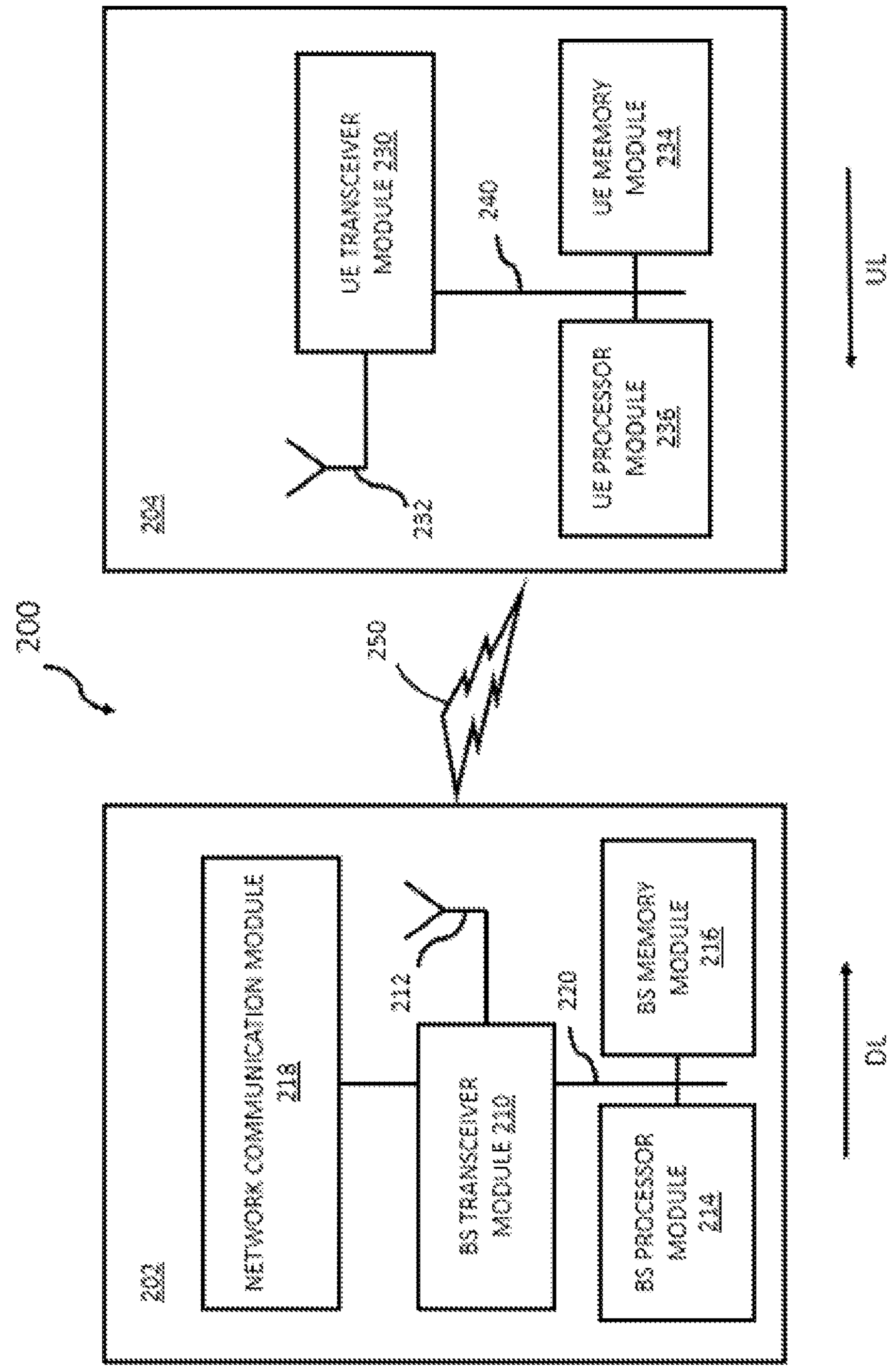
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for UE Reporting to Facilitate Handover

The movement and rotation of the wireless communication device 104 or 204 (also referred to herein as "UE") causes continuous changes in the communication quality between the wireless communication node 102 or 202 and the wireless communication device 104 or 204. For instance, in a high-speed train scenario, the communication quality is not ideal in some cases. Such cases call for a better transmission/reception point (TRP) or multi-TRP group to be selected for transmission to enhance communication reliability. At present, the transmission selection of Single-TRP or Multi-TRP is usually indicated by the wireless communication node side. However, selection decided by the wireless communication node 102 or 202 has various disadvantages. For example, if the backhaul between TRPs is not ideal or the delay is long, the current TRP cannot quickly obtain the channel quality of other TRPs relative to the wireless communication device 104 or 204. Therefore, if the quality of other TRPs is better, the handover cannot be performed in time.

Embodiments described herein include the wireless communication device 104 or 204 performing measurement, triggering event report, and recommending TRP handover and/or handover between single-TRP and Multi-TRP to the wireless communication node 102 or 202. In particular, embodiments described herein address various issues associated with UE report procedure, such as the triggering event, the format of UE reporting, the signaling of the wireless communication node response (e.g., gNB's response to the report from UE), and behavior of the wireless communication device 104 or 204 after, or responsive to, the wireless communication node response. The measurement by the wireless communication device 104 or 204, to enable the wireless communication device 104 or 204 to detect the channel quality of multiple TRPs at the same time, and the configuration that allows the wireless communication device 104 or 204 to receive multiple channel state reference signals at the same time (for measurement), are also considered and addressed.

A Multi-TRP approach uses multiple TRPs to effectively improve the transmission throughput in the Long Term Evolution (LTE), Long Term Evolution-Advanced (LTE-A) and New Radio access technology (NR) in the Enhanced Mobile Broadband (eMBB) scenario. At the same time, the use of Multi-TRP transmission or reception can effectively reduce the probability of information blockage and improve the transmission reliability in Ultra-reliability and Low Latency Communication (URLLC) scenarios.

When the backhaul link between coordinated TRPs is ideal or close to ideal, the backhaul link delay between coordinated TRPs is small. In this case, it can be assumed that a scheduling transmission is shared between coordinated TRPs, and signaling interaction between TRPs is fast. To save control signaling messages on the physical layer, coordinated TRPs can share the same physical downlink control channel (PDCCH), while the scheduled data still comes from multiple TRPs. Two coordinated TRPs can send different data to the wireless communication device 104 or 204 while sharing a downlink control information (DCI). This mode is called single DCI (S-DCI) based multi-TRP. The wireless communication node 102 or 202 can inform the wireless communication device 104 or 204 to perform multi-TRP transmission of the S-DCI by indicating a transmission configuration indicator (TCI) codepoint that contains two TCI states.

If the backhaul between coordinated TRPs is not ideal, the backhaul delay between coordinated TRPs is slightly longer. Because the interaction between two TRPs may have a delay and it is difficult to share the same PDCCH, the scheduling of the two TRPs can be performed independently. The two TRPs can schedule data separately and send separate DCIs respectively to schedule data. This mode is called multi-DCI (M-DCI) based multi-TRP. The wireless communication node 102 or 202 can notify the wireless communication device 104 or 204 to start M-DCI based multi-TRP transmission through the high layer parameter CORESETPoolIndex.

Figure 3:
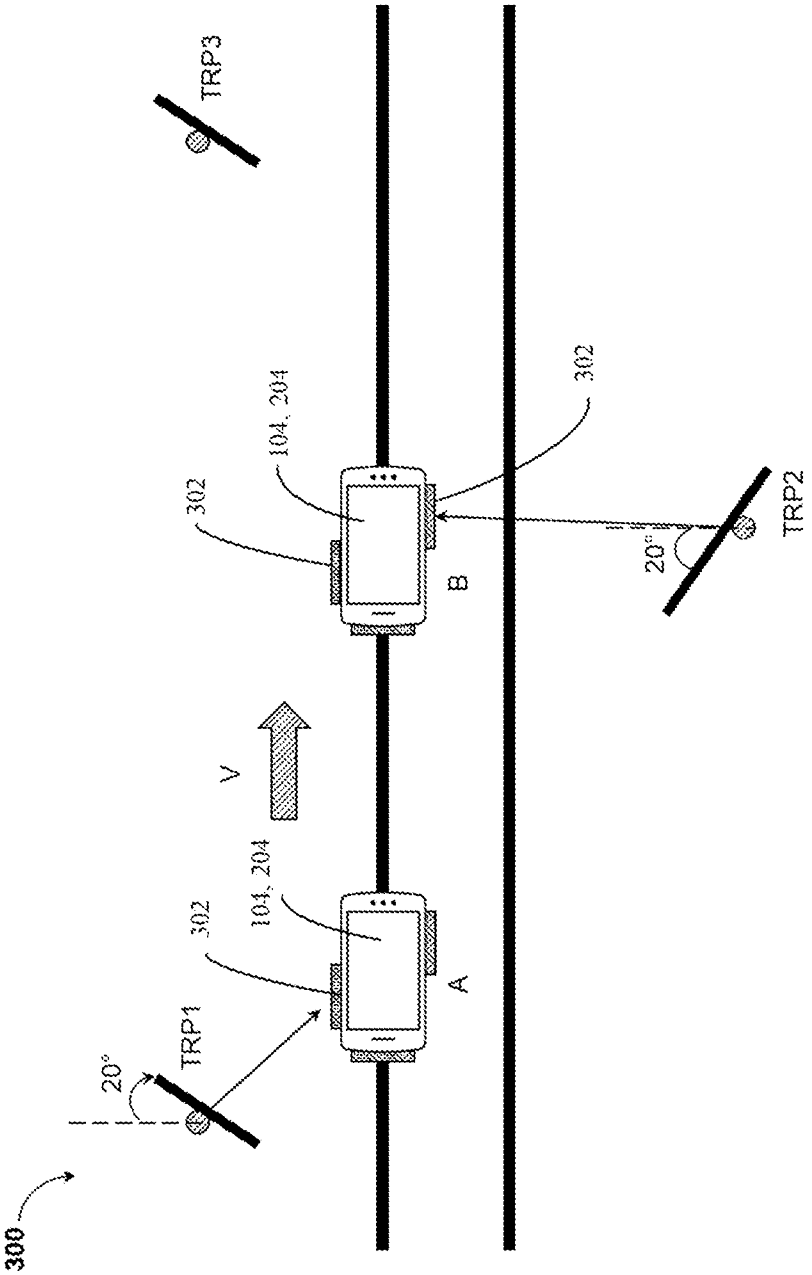
FIG. 3 shows a diagram illustrating an example TRP handover situation, in accordance with some embodiments of the present disclosure.

Referring to FIG. 3, a diagram 300 illustrating an example TRP handover situation is shown, in accordance with some embodiments of the present disclosure. There are three TRPs shown in FIG. 3, and the wireless communication device 104 or 204 is moving away from TRP1 and towards TRP2 and TRP3. The wireless communication device 104 or 204 can include one or more panels (also referred to herein as antenna panels or receiving panels) 302 for communicating with TRPs and/or wireless communication nodes 102 or 202 (not shown in FIG. 3). In the high-speed train (HST) scenario, for example, when the wireless communication device 104 or 204 moves away from the connected TRP, here TRP1, the increase of path loss and beam changes affect the channel quality between TRP1 and the wireless communication device 104 or 204. When the wireless communication device 104 or 204 is at point A, it has a connection established with TRP1. When the wireless communication device 104 or 204 moves from point A to point B, the path loss between TRP1 and the wireless communication device 104 or 204 increases gradually, and the incident angle of the beam also varies with the motion of the wireless communication device 104 or 204.

Figure 4:
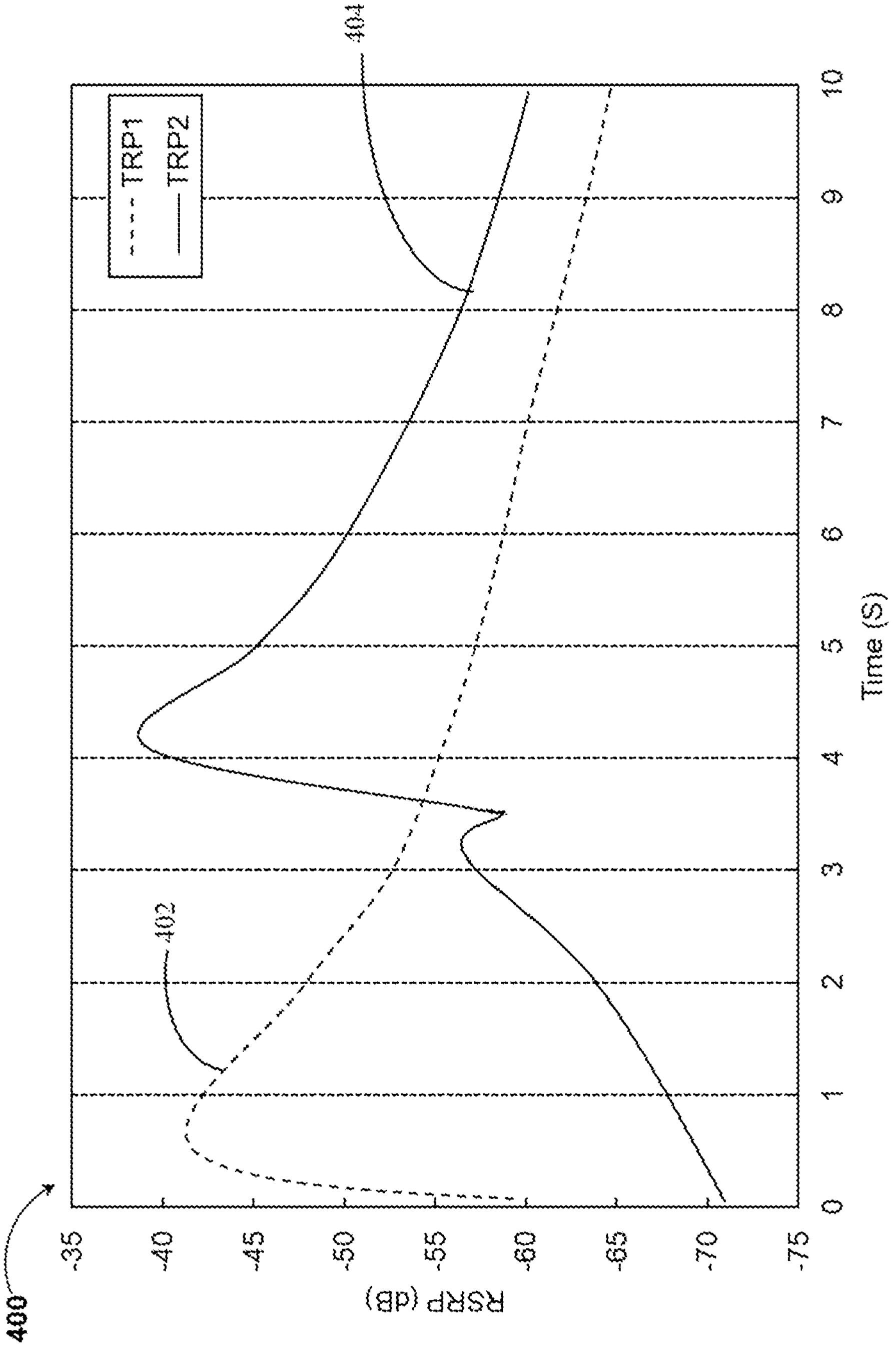
FIG. 4 shows a graph depicting reference signal received power (RSRP) curves associated with, respectively, TRP1 and TRP2 of FIG. 1, in accordance with some embodiments of the present disclosure.

Referring now to FIG. 4, a graph 400 depicting reference signal received power (RSRP) curves 402 and 404 associated with, respectively, TRP1 and TRP2 of FIG. 1 is shown, in accordance with some embodiments of the present disclosure. Here, RSRP is used as the channel quality evaluation metric/indicator. The curve 402 represents the RSRP of the TRP1 over time. As the wireless communication device 104 or 204 moves away from TRP1, the RSRP 402 decreases and path loss increases. The panel 302 on the wireless communication device 104 or 204 can rotate at an angle resulting a gradual increase in the beam gain increases at the beginning, and causing the RSRP 402 to increase. As the wireless communication device 104 or 204 continues to move away from the TRP1, the RSRP 402 decreases gradually. Conversely, as the wireless communication device 104 or 204 approaches TRP2 gradually, the corresponding RSRP 404 increases gradually, and exceeds the RSRP 402 of TRP1 at about 3.7 seconds. The decrease/degradation in RSRP 402 associated with TRP1 and increase in RSRP 404 associated with TRP2 calls for a switch/handover from TRP1 to TRP2 to ensure/maintain the communication quality.

Figure 5:
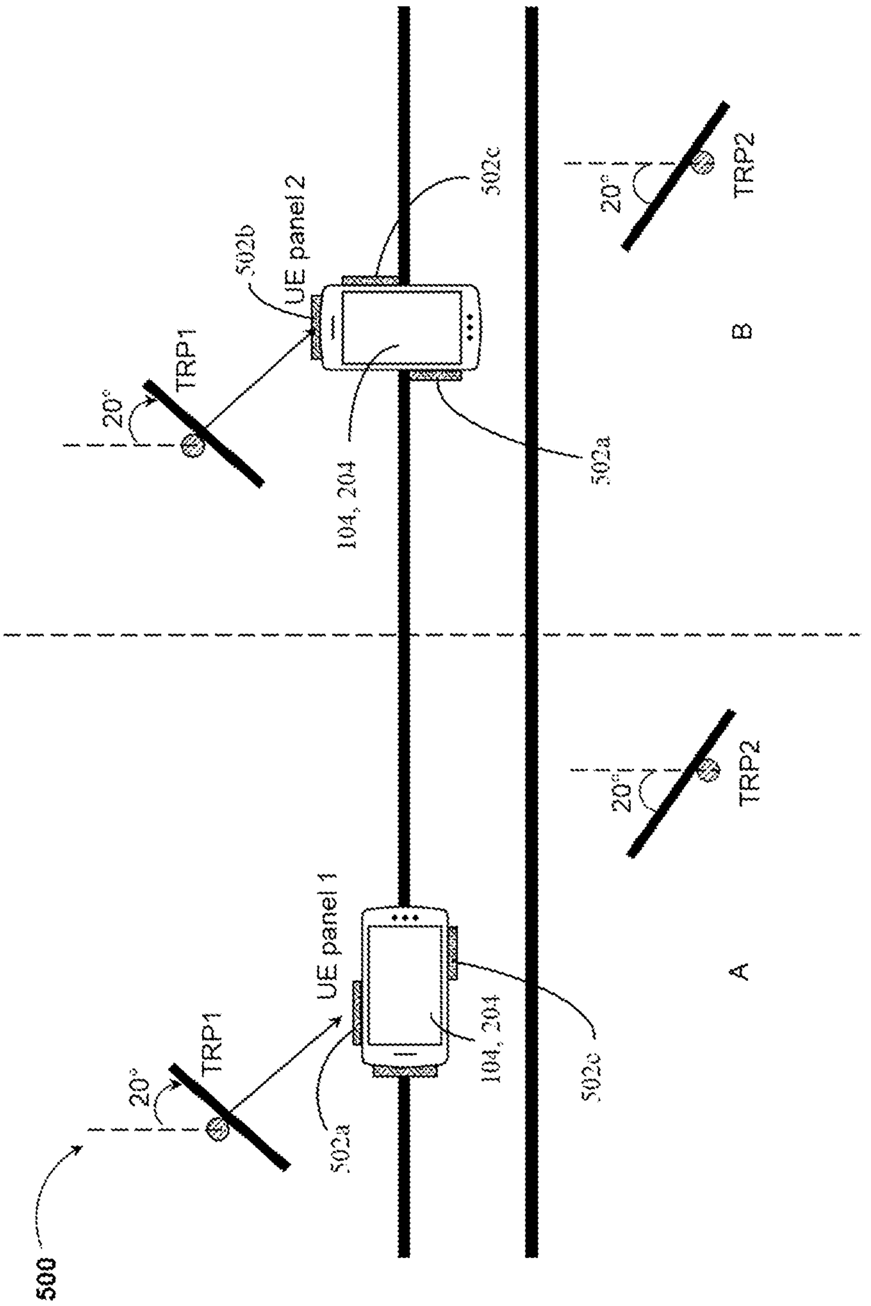
FIG. 5 shows a diagram illustrating an example scenario of switching between receiving panels, in accordance with some embodiments of the present disclosure.

Referring to FIG. 5, a diagram 500 illustrating an example scenario of switching between receiving panels is shown, in accordance with some embodiments of the present disclosure. The wireless communication device 104 or 204 may include three panels 502*a*, 502*b* and 502*c*. When the wireless communication device 104 or 204 rotates, the receiving panel 502*a* of the wireless communication device 104 or 204 changes orientation. In this case, the angle between the Tx/Rx beam and the receiving panel 502*a* changes. As a result, the wireless communication device 104 or 204 may change the selected receiving panel to ensure/maintain a communication/channel quality.

When the orientation of the wireless communication device 104 or 204 changes from mode A to mode B in FIG. 5, the orientation of the panels 502*a*, 502*b* and 502*c* with respect to the incident angle of the beam with respect to the orientation of the receiving panel 502*a* changes accordingly, which may call for changing the receiving panel of the wireless communication device 104 or 204. For instance, in the scenario shown in FIG. 5, the wireless communication device 104 or 204 switches from panel 502*a* to panel 502*b* as the receiving panel due to rotation of the wireless communication device 104 or 204. In FIG. 5, in placement mode A, panel 502*a* is the receiving panel, whereas in placement mode B, panel 502*b* is the receiving panel. In both modes, TRP1 is the transmitting TRP.

Figure 6:
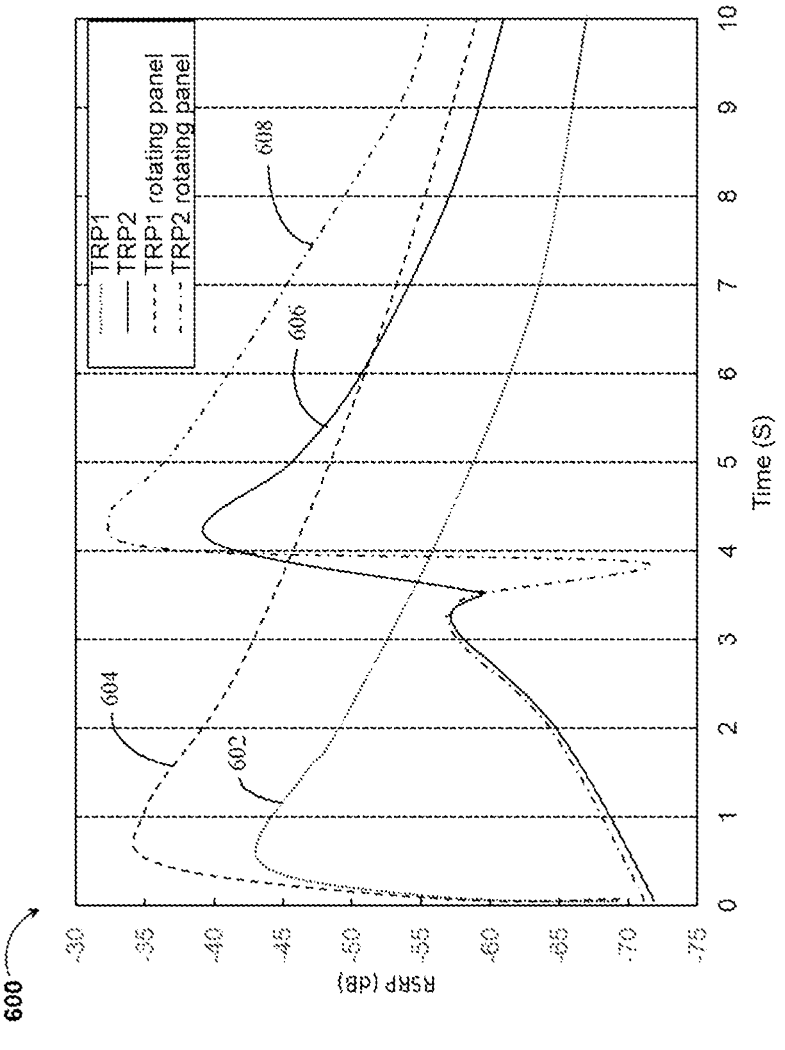
FIG. 6 shows a graph depicting RSRP curves associated with different TRPs and different orientations of a wireless communication device, in accordance with some embodiments of the present disclosure.

Referring now to FIG. 6, a graph 600 depicting RSRP curves 602, 604, 606 and 608 associated with different TRPs and different orientations of the wireless communication device 104 or 204 is shown, in accordance with some embodiments of the present disclosure. The RSRP 602 corresponds to mode A of FIG. 5, where TRP1 is the transmitting TRP and panel 502*a* is the receiving panel. The RSRP 604 represents the power transmitted by TRP2 before the wireless communication device 104 or 204 is rotated. The RSRP 604 may be the power received by panel 502*c* of the wireless communication device 104 or 204.

The RSRPs 606 and 608 represent the powers received by the wireless communication device 104 or 204, after the wireless communication device 104 or 204 is rotated. The RSRP 606 can represent the power transmitted by TRP1 and received by the wireless communication device 104 or 204, e.g., via panel 502*b*. The RSRP 608 can represent the power transmitted by TRP2 and received by the wireless communication device 104 or 204, e.g., via panel 502*c*. The wireless communication device 104 or 204, which is originally connected with TRP1, can find that the RSRP 608 associated with TRP2 is better after the rotation (or change in orientation) of the wireless communication device 104 or 204. To ensure reliable communication quality, the connection with (or reception from) TRP1 can be changed or replaced with a connection with (or reception from) TRP2.

Note that, as used herein, the "beam" can include quasi-co-location (QCL) state, transmission configuration indicator (TCI) state, spatial relation state (also called as spatial relation information state), reference signal (RS), spatial filter or pre-coding. The "Tx beam" can include (or can refer to) QCL state, TCI state, spatial relation state, DL/UL reference signal (such as channel state information reference signal (CSI-RS), synchronization signal block (SSB) (which is also called as SS/PBCH), demodulation reference signal (DMRS), sounding reference signal (SRS), and physical random access channel (PRACH), Tx spatial filter or Tx precoding. The "Rx beam" can include (or can refer to) QCL state, TCI state, spatial relation state, spatial filter, Rx spatial filter or Rx precoding; The definition of "beam ID" is equivalent to QCL state index, TCI state index, spatial relation state index, reference signal index, spatial filter index or precoding index. The spatial filter can be associated with either UE side or wireless communication node side, and the spatial filter can also be referred to as spatial-domain filter.

Note that, in this disclosure, "spatial relation information" is comprised of one or more reference RSs, which is/are used to represent "spatial relation" between targeted "RS or channel" and the one or more reference RSs. As used herein, "spatial relation" means the same/quasi-co beam(s), same/quasi-co spatial parameter(s), or same/quasi-co spatial domain filter(s). Note that "spatial relation" means the beam, spatial parameter, or spatial domain filter.

Note that, as used herein, "QCL state" is comprised of one or more reference RSs and their corresponding QCL type parameters, where QCL type parameters include at least one of the following aspect or combination Doppler spread, Doppler shift, delay spread, average delay, average gain, and Spatial parameter (which is also called as spatial Rx parameter). In this disclosure, "TCI state" is equivalent to "QCL state". As used herein, QCL-TypeA includes Doppler shift, Doppler spread, average delay and delay spread. QCL-TypeB includes Doppler shift and Doppler spread. QCL-TypeC' includes Doppler shift and average delay. QCL-TypeD includes spatial Rx parameter.

Note that, in this patent, "UL signal" can be PRACH, PUCCH, PUSCH, UL DMRS, or SRS. Note that, in this patent, "DL signal" can be PDCCH, PDSCH, SSB, DL DMRS, or CSI-RS. Note that, in this patent, group based reporting comprises at least one of "beam group" based reporting and "antenna group" based reporting. Note that, in this patent, the definition of "beam group" is that different Tx beams within one group can be simultaneously received or transmitted, and/or Tx beams between different groups may NOT be simultaneously received or transmitted. Furthermore, the definition of "beam group" is described from the UE perspective. Note that, as used herein, "TRP handover" can be defined as the switching from one TRP to another TRP, or the switching from single TRP to multi-TRP, as well as the switching from multi-TRP to single-TRP. As used herein, "RS" refers to a reference signal, it can be CSI-RS, SSB or SRS. Note that, as used herein, the "TRP index" can refer to "TRP ID", used to distinguish different TRPs. The "panel ID" can refer to UE panel index.

Figure 7:
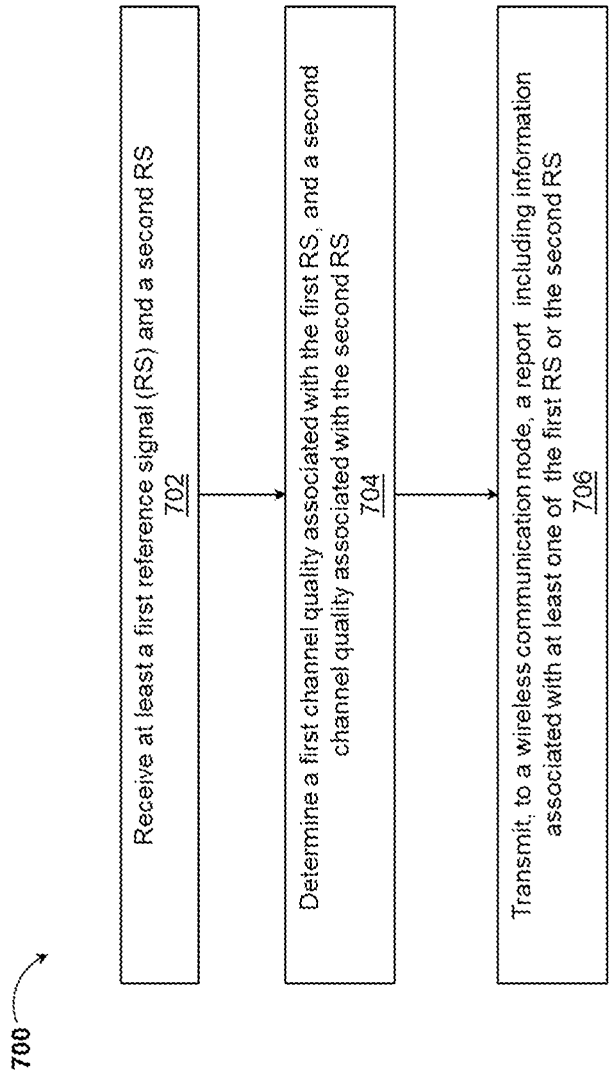
FIG. 7 shows a flowchart illustrating a method for UE reporting to facilitate handover, in accordance with some embodiments of the present disclosure.

Referring to FIG. 7, a flowchart illustrating a method 700 for UE reporting to facilitate handover is shown, in accordance with some embodiments of the present disclosure. The method 700 can include the wireless communication device 104 or 204 receiving at least a first reference signal (RS) and a second RS (STEP 702). The wireless communication device 104 or 204 may determine a first channel quality associated with the first RS, and a second channel quality associated with the second RS (STEP 704.) The wireless communication device 104 or 204 may transmit, to a wireless communication node 102 or 202, a report including information associated with at least one of the first RS or the second RS (STEP 706). The method 700 can be implemented in various ways or according to various embodiments as discussed in further detail below.

The method 700 is performed by the wireless communication device 104 or 204. From the side of the wireless communication node 102 or 202, the wireless communication node 102 or 202 can receive, from the wireless communication device 104 or 204, a report including information associated with at least one of a first reference signal (RS) or a second RS received by the wireless communication device 104 or 204. A first channel quality associated with the first RS and a second channel quality associated with the second RS can be determined by the wireless communication device 104. In response to the received report, the wireless communication node 102 or 202 can send a response to the wireless communication device 104 or 204.

According to a first embodiment, a UE event-driven procedure for TRP handover can be associated with aspects related to the triggering event, the format of UE reporting, the response of the wireless communication node 102 or 202 and the behaviour of the wireless communication device 104 or 204 receiving the response of the wireless communication node 102 or 202 as discussed below.

With respect to the triggering event, the handover procedure can be triggered/initiated at the wireless communication device 104 or 204 responsive to a detected channel quality condition and/or responsive to identification of a new TRP. The detection of the channel quality condition or the identification of the new TRP can be performed by the wireless communication device 104 or 204. In response to the detection or identification, the wireless communication can initiate a TRP handover procedure.

In some implementations, the wireless communication device 104 or 204 can use block error ratio (BLER), RSRP, SINR, CSI or channel quality information (CQI) to detect channel quality condition. Given a first reference signal (RS) corresponding to the current connected TRP, The wireless communication device 104 or 204 may compare the channel quality, e.g., BLER, corresponding to the first RS to a corresponding threshold. The triggering event can be defined as the channel quality, e.g., BLER, corresponding to the first RS being higher than or equal to the corresponding threshold. The wireless communication device 104 or 204 may compare the channel quality, e.g., RSRP, SINR, CSI or CQI, corresponding to the first reference signal (RS) to a respective threshold. The triggering event can be defined as channel quality, e.g., RSRP, SINR, CSI or CQI, corresponding to the first reference signal (RS) or being lower than or equal to the threshold.

With respect to identification of a new TRP, a second RS corresponding to a new TRP can be configured by a high layer (e.g., a layer higher than the physical layer). The wireless communication device 104 or 204 may identify the new TRP upon determining that the channel quality, e.g., BLER corresponding to the second RS is lower than or equal to a corresponding threshold. The wireless communication device 104 or 204 may identify the new TRP upon determining that the channel quality, e.g., RSRP, SINR, CSI or CQI corresponding to the second RS is higher than or equal to a respective threshold. In some implementations, the wireless communication device 104 or 204 may identify/detect the new TRP upon determining that the channel quality (e.g., BLER, RSRP, SINR, CSI or CQI) associated with the second RS is better than the channel quality (e.g., BLER, RSRP, SINR, CSI or CQI, respectively) associated with the first RS. For instance, the wireless communication device 104 or 204 can determine that the channel quality, e.g., block error ratio (BLER), based on the second RS is lower than the channel quality (BLER) based on the first RS, and/or that the channel quality, e.g., RSRP, SINR, CSI or CQI, based on the second RS is higher than the channel quality (RSRP, SINR, CSI or CQI) based on the first RS.

In some implementations, the wireless communication device 104 or 204 may identify/detect the new TRP upon determining that the channel quality (e.g., BLER, RSRP, SINR, CSI or CQI) associated with the second RS is better than the channel quality (e.g., BLER, RSRP or CQI, respectively) associated with the first RS at least by an offset value. The offset value (or offset) can be configurable, e.g., by the wireless communication node 102 or 202.

With respect to the UE report format or content, the report can include an indication of the second RS (corresponding to the new TRP as for new candidate beam/panel identification), a corresponding panel ID and/or a channel quality (e.g., BLER, RSRP, CQI) based on the second RS. The wireless communication device 104 or 204 may support implicit and/or explicit report handover mode. For implicit report, the wireless communication device 104 or 204 may only report information of the second RS, implicitly notifying the wireless communication node 102 or 202 to perform the handover from current TRP to new TRP. For explicit report, the report may contain 1 bit, e.g., indicative of a Mode 1, where "0" may imply a handover from the current TRP to the new TRP. The report can be carried by the physical uplink control channel (PUCCH), uplink control information (UCI), e.g., as RSRP, signal-to-interference noise ratio (SINR) or channel status information (CSI) reporting, or physical uplink shared channel (PUSCH), if gNodeB is configured.

With respect to the response procedure by the wireless communication node 102 or 202, the signaling of the response of the wireless communication node 102 or 202 can be a downlink channel information (DCI) or medium access control-control element (MAC-CE) command for confirming the UE reporting. For instance, the response of the wireless communication node 102 or 202 can indicate handover mode or active uplink (UL) panel for transmission. The signaling can be at least one of (i) PDCCH or DCI with the dedicated radio network dedicated identifier (RNTI) for the procedure, (ii) reconfiguration or re-indication of TCI state for DL transmission, or configuration or reconfiguration of CORESETPoolIndex.

With respect to the behavior of the wireless communication device 104 or 204 after (or responsive to) receiving the response of the wireless communication node 102 or 202, at least one of the following scenarios can be supported. According to a first scenario, a downlink (DL) signal from new TRP can be received by the wireless communication device 104 or 204 according to the quasi-colocation (QCL) assumption corresponding to the second RS. Furthermore, the DL signal and the second RS can be associated with the same component carrier/bandwidth part (CC/BWP), same CC/BWP group or same CORESETPoolIndex. Also, the DL signal and the second RS can be received by the same UE panel.

According to a second scenario, the wireless communication device 104 or 204 can transmit a UL signal to new TRP according to the spatial relation corresponding to the second RS, and/or according to the second RS as a path loss RS. The UL signal and the second RS can be associated with the same CC/BWP, same CC/BWP group or same CORESETPoolIndex. The UL signal and the second DL RS can be associated with the same UE panel.

In the high-speed railway scenario, for example, the channel quality can change dramatically due to the high-speed movement of the wireless communication device 104 or 204. Therefore, before the wireless communication device 104 or 204 detects the channel quality of the current TRP is lower than the preset threshold, the wireless communication device 104 or 204 can trigger reporting mechanism to instruct the wireless communication node 102 or 202 to configure dense RS for measurement. After the report of the wireless communication device 104 or 204, the wireless communication node 102 or 202 can configure more dense RS for the wireless communication device 104 or 204 (for example, periodic CSI-RS or semi-persistent CSI-RS with a short periodic cycle).

Due to the fast fluctuation of radio channels, the RSRP measurement value can keep fluctuating. Such fluctuation can be referred to as the ping-pong effect. To prevent the wireless communication device 104 or 204 from frequently reporting frequent TRP handovers after measurement due to the ping-pong effect, the wireless communication device 104 or 204 can report the handover mode only when the channel quality of the current TRP is worse than the threshold for a number of (measurements) times and/or the channel quality of the new TRP is better than the threshold for a number of (measurements) times. The number of times can be configured on the network side, e.g., by the wireless communication node 102 or 202.

According to the above description of the first embodiment, if the channel quality based on the second RS and the channel quality based on the first RS are both better than a threshold, the wireless communication device 104 or 204 will not report to the wireless communication node 102 or 202.

Figure 8:
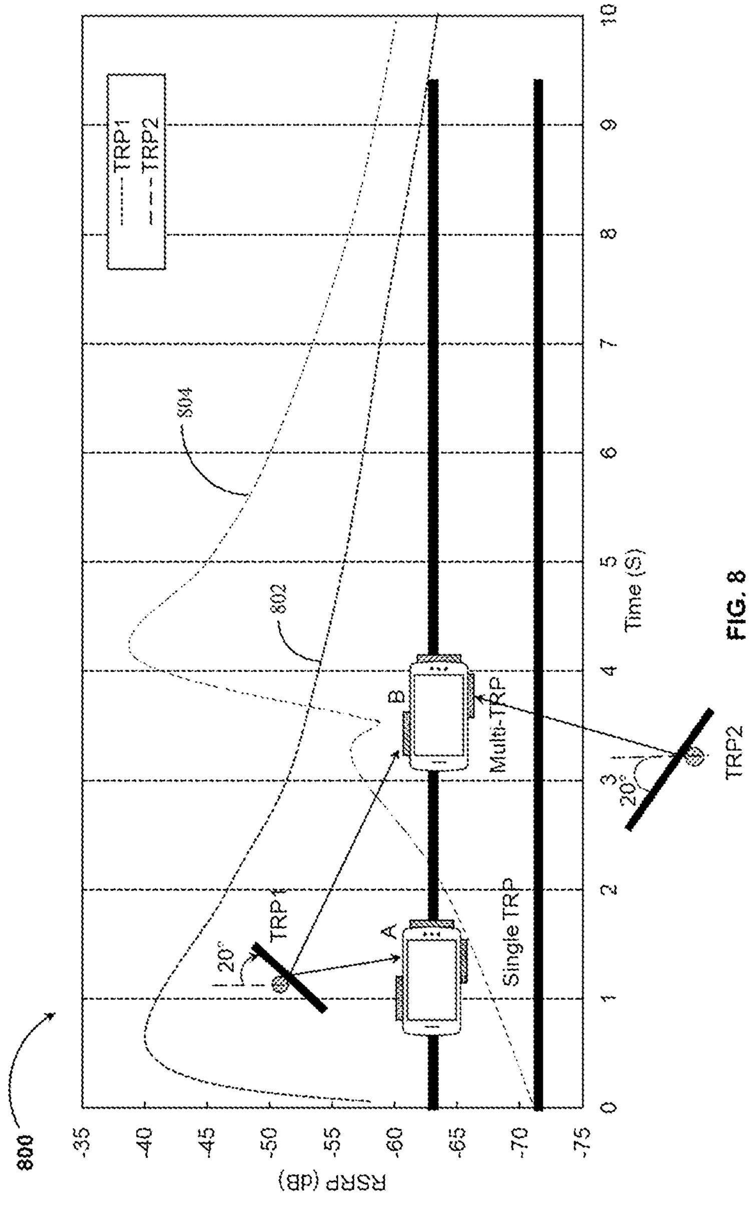
FIG. 8 shows a diagram illustrating a handover from a single TRP transmission to a multi-TRP transmission, in accordance with some embodiments of the present disclosure.

Referring now to FIG. 8, a diagram 800 illustrating a handover from a single TRP transmission to a multi-TRP transmission is shown. When the wireless communication device 104 or 204 moves from point A to point B, the RSRP 802 of TRP1 gradually drops, but the channel quality may still be better than a predefined threshold. The RSRP 804 of TRP2 increases and exceeds the RSRP 802 of TRP1 near point B and the channel quality may be better than the predefined threshold. If the channel quality of TRP2 is similar to that of TRP1, the wireless communication device 104 or 204 can also report multi-TRP transmission of TRP1 and TRP2 to enhance transmission reliability. Therefore, the following processes, associated with a second embodiment, can be further supported by the wireless communication device 104 or 204 and the wireless communication node 102 or 202.

With respect to the triggering event the handover procedure can be triggered/initiated at the wireless communication device 104 or 204 responsive to a detected channel quality condition and/or responsive to an identification of a new TRP. The detection of the channel quality condition or the identification of the new TRP can be performed by the wireless communication device 104 or 204. In response to the detection of the channel quality condition or the new TRP identification, the wireless communication can initiate a TRP handover procedure as described below.

With respect to detection of the channel quality condition, a first RS corresponding to the current connected TRP can be configured by a high layer. The wireless communication device 104 or 204 can detect the channel quality condition if channel quality, e.g., block error ratio (BLER), corresponding to the first RS is determined to be lower than or equal to a threshold. The wireless communication device 104 or 204 can detect the channel quality condition if channel quality, e.g., RSRP, SINR or CSI, CQI, corresponding to the first RS is determined to be higher than or equal to a threshold.

With respect to identification of a new TRP, a second RS corresponding to a new TRP can be configured by a high layer. The wireless communication device 104 or 204 may identify/detect a new TRP upon determining that the channel quality, e.g., BLER corresponding to the second RS is lower than or equal to a threshold. The wireless communication device 104 or 204 may identify the new TRP upon determining that the channel quality, e.g., RSRP, SINR or CSI, CQI corresponding to the second RS is higher than or equal to a threshold. In some implementations, the wireless communication device 104 or 204 may identify/detect the new TRP upon determining that the channel quality based on the second RS is better than the channel quality based on the first RS.

The wireless communication device 104 or 204 may identify/detect a new TRP upon determining that the channel quality, e.g., block error ratio (BLER), based on the second RS is lower than the channel quality based on the first RS. The wireless communication device 104 or 204 may identify/detect a new TRP upon determining that the channel quality, e.g., RSRP, or CQI, based on the second RS is higher than the channel quality based on the first RS. In some implementations, the wireless communication device 104 or 204 may identify/detect the new TRP upon determining that the channel quality based on the second RS is within a channel quality range that is bounded at one end (or low end) by an offset value below the first channel quality (first RS quality−offset), and bounded at another end (high end) by the offset value above the first channel quality (first RS quality+offset). That is, the channel quality range can have a first bound equal to the difference between the first channel quality and an offset amount, and a second bound equal to the sum of the offset amount and the first channel quality. The offset may be configurable, e.g., by the wireless communication node 102 or 202.

With respect to the UE report format or content, the report can include an indication of the first RS (corresponding to the current TRP) and the second RS (corresponding to the new TRP as for new candidate beam/panel identification), a corresponding panel ID and/or channel quality (e.g., BLER, RSRP, CQI). The channel quality may contain at least one of the first channel quality and the second channel quality respectively, or the first channel quality and joint channel quality determined using both the first RS and the second RS. The first RS and the second RS can be received simultaneously by the wireless communication device 104 or 204. The first RS and the second RS can be jointly used for determining a channel quality. The report can be carried by PUCCH, UCI (e.g., as a RSRP, SINR or CSI reporting) or PUSCH (if gNodeB is configured).

With respect to the response procedure by the wireless communication node 102 or 202, the signaling of response of the wireless communication node 102 or 202 can be a DCI or MAC-CE command for confirming the UE reporting. For instance, the response of the wireless communication node 102 or 202 can indicate handover mode or active UL panel for transmission. The signaling can be at least one of PDCCH or DCI with the dedicated RNTI for the procedure, reconfiguration or re-indication of TCI state for DL transmission, or configuration or reconfiguration of CORESETPoolIndex.

With respect to the behavior of the wireless communication device 104 or 204 after (or responsive to) receiving the response of the wireless communication node 102 or 202, at least one of the following scenarios can be supported. According to a first scenario, a DL signal from new TRP can be received by the wireless communication device 104 or 204 according to the QCL assumption corresponding to the second RS. The DL signal and the second RS can be associated with the same CC/BWP, same CC/BWP group or same CORESETPoolIndex. The DL signal and the second RS can be received by the same UE panel.

According to a second scenario, the wireless communication device 104 or 204 can transmit a UL signal to the new TRP according to the spatial relation corresponding to the second RS, and/or according to the second RS as a path loss RS. The UL signal and the second RS can be associated with the same CC/BWP, same CC/BWP group or same CORESETPoolIndex. The UL signal and the second DL RS can be associated with the same UE panel. In the high-speed railway scenario, for example, the channel quality can change dramatically due to the high-speed movement of the wireless communication device 104 or 204. Therefore, before the wireless communication device 104 or 204 detects the channel quality of the current TRP is lower than the preset threshold, the wireless communication device 104 or 204 can trigger a reporting mechanism to instruct the wireless communication node 102 or 202 to configure dense RS for measurement. After the report of the wireless communication device 104 or 204, the wireless communication node 102 or 202 can configure more dense RS for the wireless communication device 104 or 204 (for example, periodic CSI-RS or semi-persistent CSI-RS with a short periodic cycle).

Due to the fast fluctuation of radio channels, the RSRP measurement value can keep fluctuating. Such fluctuation can be referred to as the ping-pong effect. To prevent the wireless communication device 104 or 204 from frequently reporting frequent TRP handovers after measurement due to the ping-pong effect, the wireless communication device 104 or 204 can report the handover mode only when the channel quality of the current TRP is better than the threshold for a number of (measurements) times and/or the channel quality of the new TRP is better than the threshold for a number of (measurements) times. The number of times can be configured on the network side, e.g., by the wireless communication node 102 or 202.

According to a third embodiment of TRP handover, the handover procedure can be triggered/initiated at the wireless communication device 104 or 204 responsive to a detected channel quality condition and/or responsive to an identification of a new TRP. The detection of the channel quality condition or the identification of the new TRP can be performed by the wireless communication device 104 or 204. In response to the detection or identification, the wireless communication can initiate a TRP handover procedure as described below.

For a first RS corresponding to the current connected TRP, the wireless communication device 104 or 204 can detect the channel quality condition upon (or responsive to) determining that the channel quality, e.g., block error ratio (BLER), corresponding to the first RS is lower than or equal to a predefined threshold. The wireless communication device 104 or 204 may detect the channel quality condition upon (or responsive to) determining that the channel quality, e.g., RSRP, SINR, CSI or CQI, corresponding to the first RS is higher than or equal to a predefined threshold.

For a second RS corresponding to a new TRP, the wireless communication device 104 or 204 can detect a new TRP upon (or responsive to) determining that the channel quality, e.g., BLER corresponding to the second RS is lower than or equal to a predefined threshold. The wireless communication device 104 or 204 may detect the new TRP upon (or responsive to) determining that the channel quality, e.g., RSRP, SINR, CSI or CQI corresponding to the second RS is higher than or equal to a predefined threshold.

In some implementations, the wireless communication device 104 or 204 may detect the new TRP upon (or responsive to) determining that the channel quality based on the second RS is better than the channel quality based on the first RS. The wireless communication device 104 or 204 may detect the new TRP upon (or responsive to) determining that the channel quality based on the second RS is within a channel quality range that is bounded at one end (or low end) by an offset value below the first channel quality (first RS quality−offset), and bounded at another end (high end) by the offset value above the first channel quality (first RS quality+offset). That is, the channel quality range can have a first bound equal to the difference between the first channel quality and an offset amount, and a second bound equal to the sum of the offset amount and the first channel quality. The offset may be configurable, e.g., by the wireless communication node 102 or 202.

With respect to the UE report format or content, the report can include, an indication of the second RS (corresponding to the new TRP as for new candidate beam/panel identification), corresponding panel ID, channel quality (e.g., BLER, RSRP, CQI) and 1-bit. The channel quality may contain at least one of the second channel quality or a joint channel quality determined using (or based on) both the first RS and the second RS. The report may report contain 1 bit, e.g., indicative of Mode 2, where "1" means handover from single-TRP (current TRP) to multi-TRP (current TRP and new TRP). The first RS and the second RS can be received simultaneously by the wireless communication device 104 or 204. The first RS and the second RS can be jointly used for determining a channel quality. The report can carried by PUCCH, UCI (e.g., as a RSRP, SINR, CQI or CSI reporting) or PUSCH (if gNodeB is configured).

According to the description of the second and third embodiments, after the single-TRP-to-multi-TRP switching, the multi-TRP transmission provides higher transmission reliability. However, when the wireless communication device 104 or 204 continues to move, the RSRP measurement value of one TRP can gradually increase and become better than the RSRP measurement value of the other TRP. In this case, to save unnecessary resource overheads, the multi-TRP can be switched to the single-TRP transmission. In the following, a fourth embodiment related to multi-TRP to single TRP handover is described.

Figure 9:
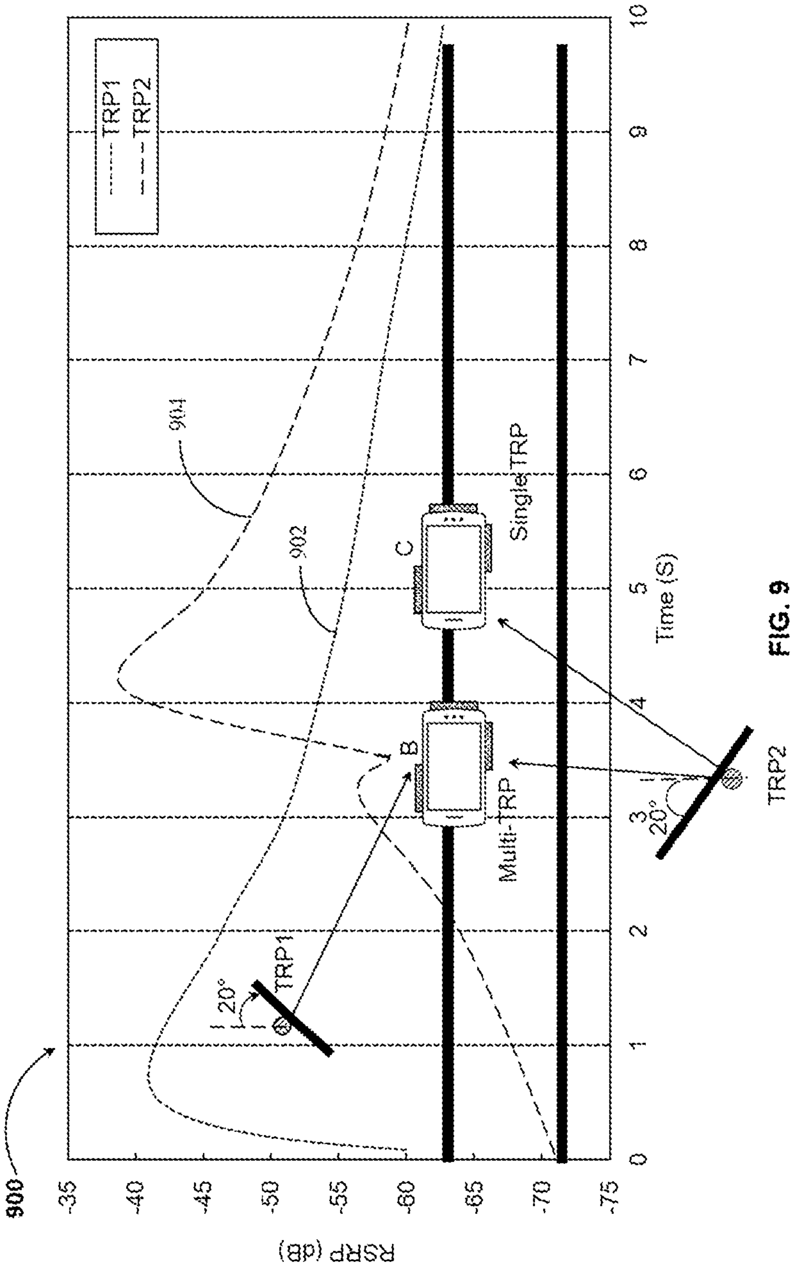
FIG. 9 shows a diagram illustrating a handover from a multi-TRP transmission to a single TRP transmission is shown, in accordance with some embodiments of the present disclosure.

Referring now to FIG. 9, a diagram 900 illustrating a handover from a multi-TRP transmission to a single TRP transmission is shown, in accordance with some embodiments of the present disclosure. When the wireless communication device 104 or 204 moves from point B to point C, the RSRP 902 of TRP1 gradually decreases, and the RSRP 904 of TRP2 gradually increases. At this time, the difference between them is gradually increased, and the communication with the wireless communication device 104 or 204 can be completed through the TRP2 only. The wireless communication device 104 or 204 can report to the wireless communication node 102 or 202 and recommend single-TRP transmission of the TRP2 to reduce unnecessary overhead. Accordingly, the procedure of switching from multi-TRP to single-TRP can be by the wireless communication device 104 or 204 (and the wireless communication node 102 or 202).

With respect to the triggering event, the handover procedure can be triggered/initiated at the wireless communication device 104 or 204 responsive to a detected degradation of the channel quality. The detection of the channel quality degradation can be performed by the wireless communication device 104 or 204. In response to the detection of channel degradation, the wireless communication can initiate a TRP handover procedure.

For a first RS corresponding to the TRP with worse channel quality of current connected TRPs, the wireless communication device 104 or 204 can detect channel degradation upon determining that channel quality, e.g., block error ratio (BLER), corresponding to the first RS is higher than or equal to a threshold. The wireless communication device 104 or 204 may detect channel degradation upon determining that channel quality, e.g., RSRP, SINR, CSI or CQI, corresponding to the first RS is lower than or equal to a threshold.

For the second RS corresponding to the TRP with better channel quality of current connected TRPs, the wireless communication device may determine (as part of the triggering event) that the channel quality, e.g., block error ratio (BLER), corresponding to the first RS is lower than or equal to a predefined threshold. The wireless communication device 104 or 204 may determine the channel quality, e.g., RSRP, SINR, CSI or CQI, corresponding to the second RS is higher than or equal to a predefined threshold.

In some implementations, the wireless communication device may determine (as part of the triggering event) that the channel quality based on the second RS is better than the channel quality based on the first RS. In some implementations, the wireless communication device may determine (as part of the triggering event) that the channel quality based on the second RS is better than the channel quality based on the first RS by at least an offset value (or an offset). The offset can be configurable, e.g., by the wireless communication node 102 or 202.

With respect to the UE report format or content, the report can include, an indication of the second RS (corresponding to the better TRP), corresponding panel ID and/or channel quality (e.g., BLER, RSRP, CQI) based on the second RS. The report may contain 1 bit, e.g., indicative of Mode 3, where "none" means handover from multi-TRP (current TRPs) to single-TRP (better TRP). The report can be carried by PUCCH, UCI (e.g., as a RSRP, SINR or CSI reporting) or PUSCH (if gNodeB is configured).

Implicit and/or explicit report handover modes(s) can be supported. For implicit report, the wireless communication device 104 or 204 can only report information of second RS, implicitly notifying the wireless communication node 102 or 202 to perform the handover from multi-TRP (current TRPs) to single-TRP (one of current TRPs). The single TRP can be the TRP associated with the reported RS (the second RS). For implicit reporting, the report can contain 1 bit, e.g., where "none" implies handover from multi-TRP (current TRPs) to single-TRP (one of current TRPs).

With respect to the response procedure of the wireless communication node 102 or 202, the signaling of the response of the wireless communication node 102 or 202 can be a DCI or MAC-CE command for confirming receipt of the reporting by the wireless communication device 104 or 204. The response of the wireless communication node 102 or 202 can indicate handover mode or active UL panel for transmission. The signaling can be at least one of PDCCH or DCI with the dedicated RNTI for the procedure, reconfiguration or re-indication of TCI state for DL transmission, or configuration or reconfiguration of CORESETPoolIndex.

With respect to the behavior of the wireless communication device 104 or 204 after (or responsive to) receiving the response of the wireless communication node 102 or 202, at least one of the following scenarios can be supported. According to a first scenario, a DL signal from the single TRP can be received by the wireless communication device 104 or 204 according to the QCL assumption corresponding to the second RS. The DL signal and the second RS can be associated with the same CC/BWP, same CC/BWP group or same CORESETPoolIndex. The DL signal and the second RS can be received by the same UE panel.

According to a first scenario, the wireless communication device can transmit a UL signal to the single TRP according to the spatial relation corresponding to the second RS or according to the second RS as path loss RS. The UL signal and the second RS can be associated with the same CC/BWP, same CC/BWP group or same CORESETPoolIndex. The UL signal and the second DL RS can be associated with the same UE panel.

The various embodiments described above and in the claims can be implemented as computer code instructions that are executed by one or more processors of the wireless communication device (or UE) 104 or 204 or the wireless communication node 102 or 202. A computer-readable medium may store the computer code instructions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

receiving, by a wireless communication device, at least a first reference signal (RS) from a first transmission and reception point (TRP), and a second RS from a second TRP;

determining, by the wireless communication device, a first channel quality associated with the first RS, and a second channel quality associated with the second RS;

detecting, by the wireless communication device, using at least one of the first channel quality or the second channel quality, a triggering event indicating a change in a TRP group including the first TRP and the second TRP, the TRP group used for transmission to the wireless communication device;

transmitting, by the wireless communication device to a wireless communication node, responsive to detecting the triggering event, a report including information associated with at least one of the first RS or the second RS, the report including a handover recommendation determined by the wireless communication device, the handover recommendation recommending a handover from the TRP group to a different TRP or TRP group, the report further including an index of the second RS and a 1-bit value indicating a switching mode; and based on a response to the report from the wireless communication node, switching, by the wireless communication device, reception and/or transmission from the TRP group to the different TRP or TRP group according to the switching mode.

2. The method of claim 1, wherein the report includes the information associated with the first RS and the second RS in response to the triggering event determined according to the first channel quality and the second channel quality, the triggering event comprising at least one of:

the first channel quality associated with the first RS, is better than or equal to a threshold, and the second channel quality associated with the second RS, is better than or equal to the threshold, the first channel quality associated with the first RS, is better than or equal to the threshold, and the second channel quality associated with the second RS, is better than or equal to the first channel quality, or the first channel quality associated with the first RS, is better than or equal to the threshold, and the second channel quality associated with the second RS, is within a channel quality range having a first bound equal to a difference between the first channel quality and an offset amount, and a second bound equal to a sum of the offset amount and the first channel quality.

3. The method of claim 2, wherein a channel quality better than or equal to a threshold comprises at least one of:

a corresponding block error ratio (BLER) is lower than or equal to a first threshold, or a corresponding reference signal received power (RSRP), channel state information (CSI), signal-to-interference-plus-noise ratio (SINR) or channel quality information (CQI), is higher than or equal to a second threshold.

4. The method of claim 2, wherein the offset amount is configurable.

5. The method of claim 2, wherein the report includes at least one of:

indexes of the first RS and the second RS respectively, indexes of panels of the wireless communication device corresponding to the first RS and the second RS respectively, or the first channel quality and the second channel quality, or the first channel quality and a joint channel quality determined using the first RS and the second RS.

6. The method of claim 2, wherein the first RS and the second RS can be received simultaneously by the wireless communication device, or the first RS and the second RS can be jointly used for determining a channel quality.

7. The method of claim 1, wherein the report includes the information associated with second RS in response to a triggering event determined according to the second channel quality, the triggering event comprising at least one of:

the first channel quality associated with the first RS, is worse than or equal to a threshold, and the second channel quality associated with the second RS, is better than or equal to the threshold, the first channel quality associated with the first RS, is worse than or equal to the threshold, and the second channel quality associated with the second RS, is better than the first channel quality, or the first channel quality associated with the first RS, is worse than or equal to the threshold, and the second channel quality associated with the second RS, is better than the first channel quality, by an offset amount.

8. The method of claim 7, wherein a channel quality worse than or equal to a threshold comprises at least one of:

a corresponding block error ratio (BLER) is higher than or equal to a first threshold, or a corresponding reference signal received power (RSRP), channel state information (CSI), signal-to-interference-plus-noise ratio (SINR) or channel quality information (CQI), is lower than or equal to a second threshold.

9. The method of claim 7, wherein the offset amount is configurable.

10. The method of claim 7, wherein the report further includes at least one of:

an index of a panel of the wireless communication device corresponding to the second RS, or the second channel quality.

11. The method of claim 1, wherein the switching mode including at least one of:

Mode 1, switching from receiving from a channel of the first RS to a channel of the second RS, or Mode 3, switching from receiving from the channels of the first RS and the second RS to the channel of the second RS.

12. The method of claim 1, wherein the report includes the information associated with the second RS in response to the triggering event determined according to the second channel quality, the triggering event comprising at least one of:

the first channel quality associated with the first RS, is better than or equal to a threshold, and the second channel quality associated with the second RS, is better than or equal to the threshold, the first channel quality associated with the first RS, is better than or equal to the threshold, and the second channel quality associated with the second RS, is better than the first channel quality, or the first channel quality associated with the first RS, is better than or equal to the threshold, and the second channel quality associated with the second RS, is within a channel quality range having a first bound equal to a difference between the first channel quality and an offset amount, and a second bound equal to a sum of the offset amount and the first channel quality.

13. The method of claim 12, wherein a channel quality better than or equal to a threshold comprises at least one of:

a corresponding block error ratio (BLER) is lower than or equal to a first threshold, or a corresponding reference signal received power (RSRP), channel state information (CSI), signal-to-interference-plus-noise ratio (SINR) or channel quality information (CQI), is higher than or equal to a second threshold.

14. The method of claim 13, wherein the offset amount is configurable.

15. The method of claim 13, wherein the report further includes at least one of:

an index of a panel of the wireless communication device corresponding to the second RS, or the second channel quality, or the first channel quality and a joint channel quality determined using the first RS and the second RS.

16. The method of claim 15, wherein the switching mode includes:

Mode 2, switching from receiving from the channel of the first RS to the channels of the first RS and the second RS.

17. The method of claim 16, wherein when the 1-bit value is indicative of Mode 2, the first RS and the second RS can be received simultaneously by the wireless communication device, or the first RS and the second RS can be used for jointly determining a channel quality.

18. A method comprising:

receiving, by a wireless communication node from a wireless communication device, a report including information associated with at least one of a first reference signal (RS) from a first transmission and reception point (TRP) or a second RS from a second TRP, the first RS and the second RS received by the wireless communication device, the report further including an index of the second RS and a 1-bit value indicating a switching mode, wherein the report is received responsive to a triggering event determined using at least one of a first channel quality associated with the first RS, or a second channel quality associated with the second RS, the triggering event indicating a change in a TRP group including the first TRP and the second TRP, wherein the report includes a handover recommendation determined by the wireless communication device, the handover recommendation recommending a handover from the TRP group to a different TRP or TRP group; and transmitting, by the wireless communication node to the wireless communication device, a response to the request, wherein the response causes switching reception and/or transmission from the TRP group to the different TRP or TRP group according to the switching mode.

19. A wireless communication device comprising:

at least one processor configured to:

receive, via a transceiver, at least a first reference signal (RS) from a first transmission and reception point (TRP), and a second RS from a second TRP;

determine a first channel quality associated with the first RS, and a second channel quality associated with the second RS;

detect, using at least one of the first channel quality or the second channel quality, a triggering event indicating a change in a TRP group including the first TRP and the second TRP, the TRP group used for transmission to the wireless communication device;

transmit, via the transceiver to a wireless communication node, responsive to detecting the triggering event, a report including information associated with at least one of the first RS or the second RS, the report including a handover recommendation determined by the wireless communication device, the handover recommendation recommending a handover from the TRP group to a different TRP or TRP group, the report further including an index of the second RS and a 1-bit value indicating a switching mode; and based on a response to the report from the wireless communication node, switch reception and/or transmission from the TRP group to the different TRP or TRP group according to the switching mode.

20. A wireless communication node comprising:

at least one processor configured to:

receive, via a receiver from a wireless communication device, a report including information associated with at least one of a first reference signal (RS) from a first transmission and reception point (TRP) or a second RS from a second TRP, the first RS and the second RS received by the wireless communication device, the report further including an index of the second RS and a 1-bit value indicating a switching mode, wherein the report is received responsive to a triggering event determined using at least one of a first channel quality associated with the first RS, or a second channel quality associated with the second RS, the triggering event indicating a change in a TRP group including the first TRP and the second TRP, wherein the report includes a handover recommendation determined by the wireless communication device, the handover recommendation recommending a handover from the TRP group to a different TRP or TRP group;

transmit, via a transmitter to the wireless communication device, a response to the request, wherein the response causes switching reception and/or transmission from the TRP group to the different TRP or TRP group according to the switching mode.

* * * * *